Oct. 2, 1923.
E. R. DAVIS
1,469,296
METHOD OF MAKING BELL GUIDES
Original Filed Dec. 15, 1921   2 Sheets-Sheet 2
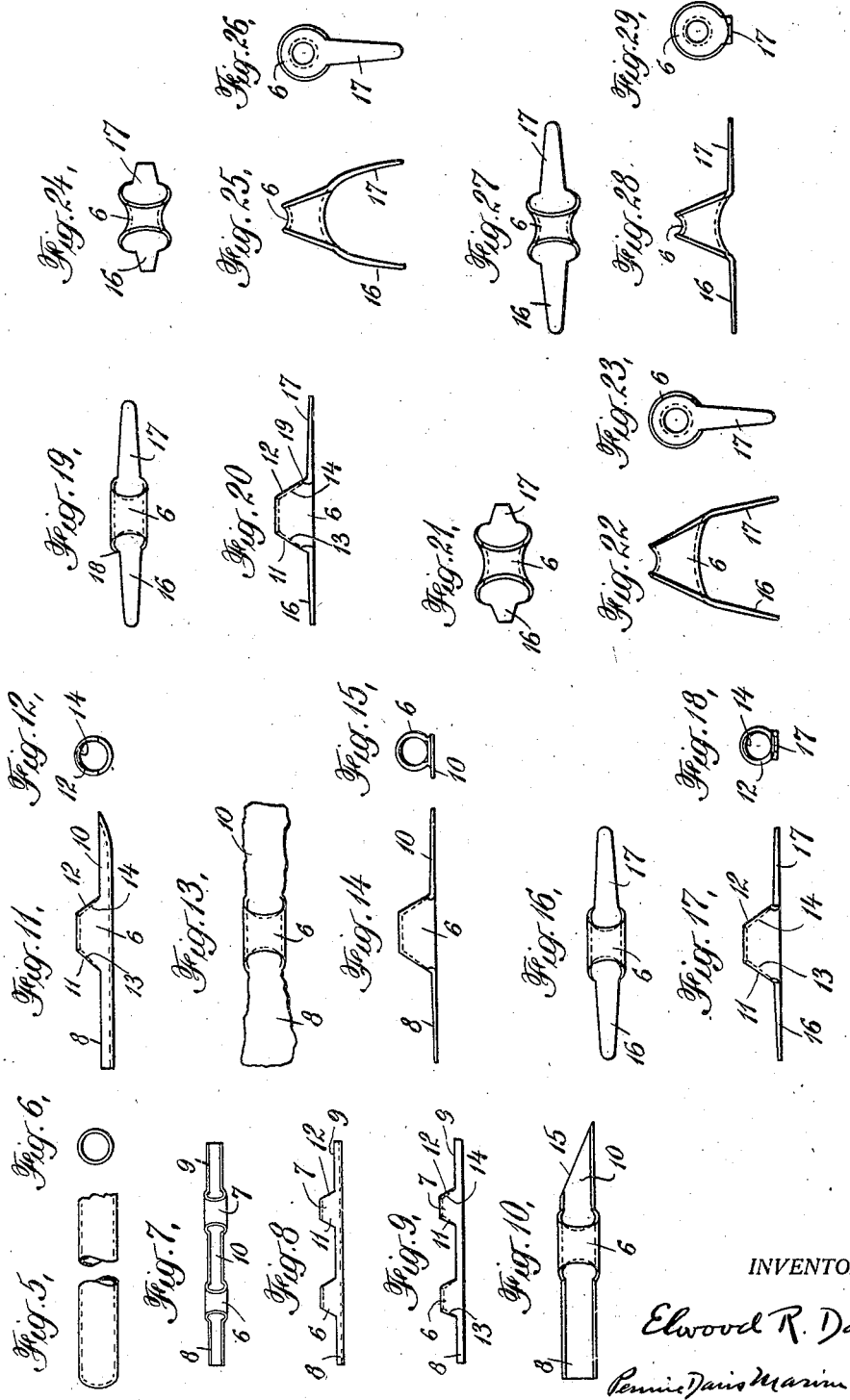

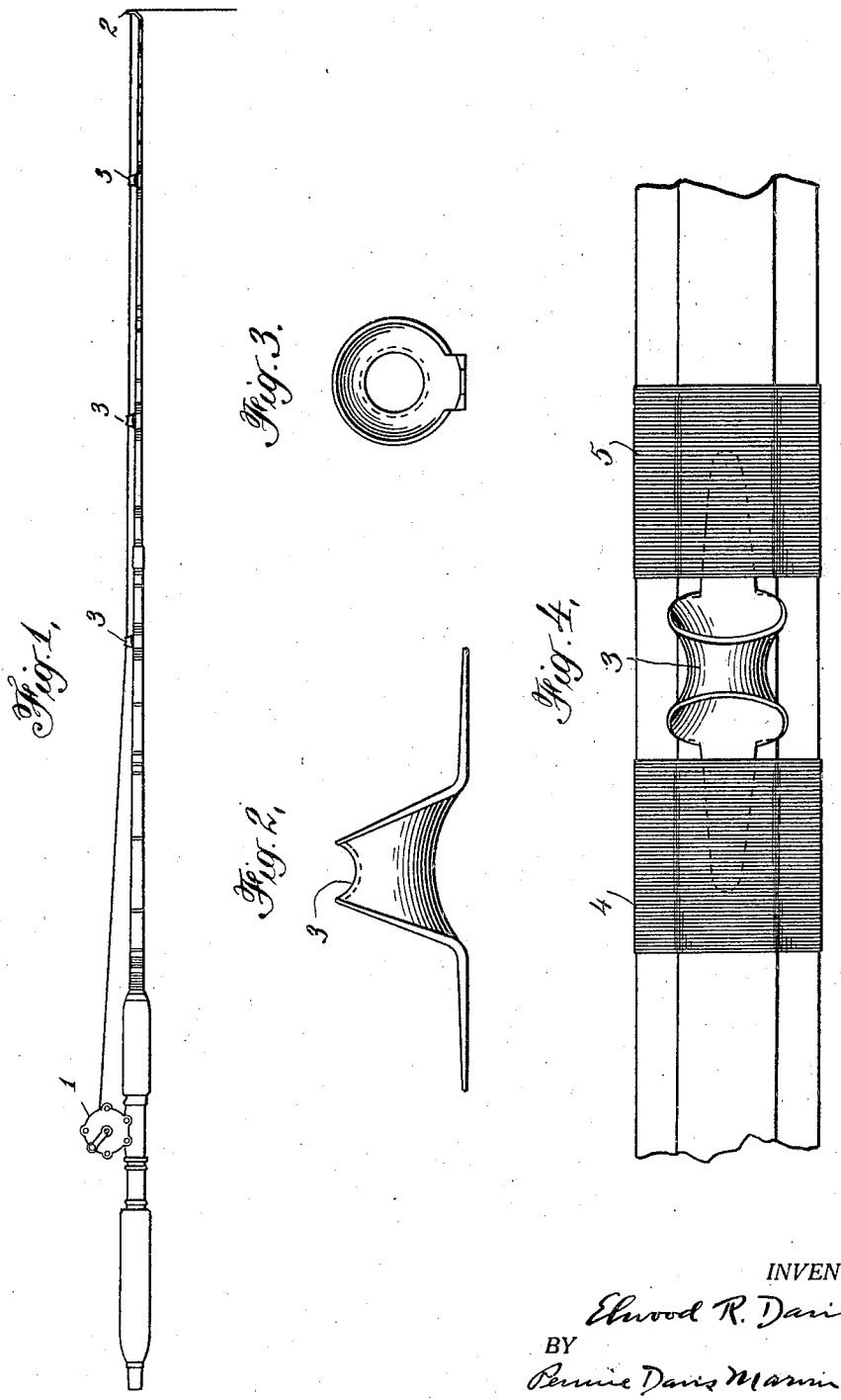

Patented Oct. 2, 1923.

1,469,296

UNITED STATES PATENT OFFICE.

ELWOOD R. DAVIS, OF WEST HAVEN, CONNECTICUT, ASSIGNOR TO WINCHESTER REPEATING ARMS COMPANY, OF NEW HAVEN, CONNECTICUT, A CORPORATION OF CONNECTICUT.

METHOD OF MAKING BELL GUIDES.

Original application filed December 15, 1921, Serial No. 522,461. Divided and this application filed July 20, 1922. Serial No. 576,251.

*To all whom it may concern:*

Be it known that I, ELWOOD R. DAVIS, a citizen of the United States, residing at West Haven, in the county of New Haven, State of Connecticut, have invented certain new and useful Improvements in Methods of Making Bell Guides; and I do hereby declare the following to be a full, clear, and exact description of the invention, such as will enable others skilled in the art to which it appertains to make and use the same.

The present application is a division of my application Serial Number 522,461 filed Dec. 15th, 1921, which has become Patent No. 1,444,063 dated Feb. 2, 1923.

Guides are used on fishing poles to guide the line in its forward or backward travel between reel and pole tip. To prevent wear on the line, these guides are shaped to present a flaring or bell shaped mouth to the line, whether the line is travelling toward or away from the reel. It is common practice to make these guides of metal by stamping them out from a flat sheet and then rolling and pressing the blank so formed into the desired shape, after which the meeting edges are brazed together. The line of brazing is along the short element of the guide and unless the brazing is very carefully done, and the inner wearing surface of the guide is carefully finished and polished, the roughness of the joint will chafe and wear the line to an objectionable degree, and even when the brazing and finishing are carefully done, the rubbing of the line in the guide is likely to wear the metal away at or near the brazed joint, and, because of unequal wearing qualities of the metal sheet and the brazing metal, is likely to score or groove the guide and develop rough edges and irregularities destructive to the line.

It is an object of the present invention to provide a method whereby bell shaped guides for the lines of fishing poles can be made without the usual brazed seam and of such form and material that the wear on the fishing line while passing through these guides will be reduced to a minimum.

It is a further object of the invention to produce a seamless bell guide in reliable manner and with economy in labor and materials and of such form that it can be attached readily to fishing poles either of split bamboo or of metal. Other objects and advantages will become clear from the following detailed description taken in conjunction with the accompanying drawings, wherein, Fig. 1 shows a fishing pole with three bell guides between the reel and the pole tip.

Fig. 2 is an enlarged side elevation of one of the guides;

Fig. 3 is an end elevation of the same;

Fig. 4 shows the guide lashed to a split bamboo pole by means of windings of silk;

Fig. 5 shows a seamless tube from which a plurality of guides are made;

Fig. 6 is an end elevation of the tube;

Fig. 7 is a plan view of the tube after part of the metal has been cut and trimmed away to blank out two guides;

Fig. 8 is a side view of the same;

Fig. 9 shows the blank in elevation after the burrs have been removed.

Figs. 10 to 16 inclusive illustrate the shearing and swaging steps of the method.

Figs. 17 to 26 inclusive show subsequent steps in the shaping of the metal into the desired bell guide.

Fig. 27 is a plan view of a completed guide.

Figs. 28 is a side elevation and 29 is an end elevation of the same.

The fishing pole (Fig. 1) has a reel 1 and pole tip 2 and in its passage to or from the reel, the line is guided by a plurality of guides 3, suitably distributed along the pole. As shown in Fig. 4, each of these guides can be fastened in position on the pole by means of windings 4 and 5. If the pole is of split bamboo, these windings ordinarily are of silk thread. On a metal pole, they are of wire.

These guides are often subjected to heavy wear from the line, particularly when the fishing pole is used for casting or when for other reason the line is being rapidly let out or reeled in. The guides must function whether the line is passing through them in one direction or the other.

In accordance with the present invention, a ductile metal, preferably non-corrosive in character, such as an alloy of nickel and silver, is first drawn into a seamless tube, as shown in Figs. 5 and 6. This may be done by ordinary metal working processes. Such a tube may well have an external diameter of .209 to .211 and an internal diameter of .159 to .161 of an inch.

This seamless tube of drawn ductile metal is next cut away, as by milling and trimming, to leave the blank in the form shown in Figs. 7 and 8. It has a plurality of tubular bodies, 6 and 7, integral with a web which consists of end portions 8 and 9 and a central portion 10. Each of the tubular bodies is beveled at its ends 11 and 12, the beveled edges merging into the metal of the web. Further cutting and trimming may be necessary to remove burrs from the cut edge or from the inside of the tubular bodies at the points marked 13 and 14 of Fig. 9.

The trimmed blank is next sheared along the line 15 (Fig. 10) diagonally of the central web 10, thereby separating the tubular bodies 6 and 7 from one another.

The next step in the method consists in swaging the web portions 8 and 10 (Fig. 13) to flatten them and to provide stock from which to cut feet integral with the tubular body and useful in securing the guide to the fishing pole. As indicated in Fig. 14, the swaging operation may be used to taper the metal of the web from the tubular body outward to the ends of the blank.

The swaged blank is then trimmed to convert the flattened web portions 8 and 10 into feet 16 and 17, which are integral with the tubular body 6 and taper in thickness and in width. The structure is then trimmed and filed smooth, particularly at the corners marked 18 and 19, Figs. 19 and 20 respectively.

The next step consists in upsetting and expanding the tubular body to bell both ends of the opening therethrough, as indicated in Figs. 21 to 23 inclusive. Incidental to this, the feet 16 and 17 are bent downward about as shown in Fig. 22. Ordinarily, the upsetting and expanding operation can advantageously be repeated to further bell the opening through the tubular body as shown in Figs. 24 to 26 inclusive.

With the structure reduced to the form shown in Fig. 25, the final operation consists in straightening and bending up the feet 16 and 17 into the position shown in Figs. 27 to 29 inclusive, so that they can lie flat against the side of the fishing pole with the tubular body spaced from the pole to hold the guided fishing line out of contact with the windings by which the feet 16 and 17 are lashed to the pole. The guide is then polished.

Starting with a drawn tube, as shown in Fig. 5, with the dimensions above mentioned, the finished guide can properly have an internal diameter of .160 to .170 of an inch at the narrow part and an external diameter of .310 to .325 of an inch across the mouth of each bell. These dimensions are but illustrative of the nature and extent of the upsetting and expanding operation and can be departed from without departing from the invention as defined by the appended claims. The guides can be made in larger or smaller sizes, as desired, due allowance being made in the dimensions of the drawn tube (Fig. 5) from which the blanks are cut.

For use on hexagonal or octagonal poles, such as are commonly made from split bamboo, the feet 16 and 17 can be entirely flat along their bottom faces, but for use on small round poles, such as are commonly made of steel, these feet may be swaged longitudinally to fit the curved surface of the pole. In either case, lashings of silk or wire, or equivalent devices must be used for securing the bell guide to the fishing pole.

Inasmuch as the interior or wearing face of the guide is smooth and polished and consists entirely of a single metal without any brazing and without any joints, the fishing line will pass along the guide with little friction and with little or no tendency to channel or groove the guide. The equalization of the wear on the curved face of the guide prevents the development of sharp corners or rough edges such as heretofore have been encountered in the use of guides with brazed joints.

The method above described is economical in labor and in materials and is well adapted to machine production in large volume. The product resulting from the method is uniform in quality, low in cost and reliable and satisfactory in operation.

I claim:

1. The method of making a bell guide, which consists in cutting away parts of a seamless tube to leave a cylindrical body with integral feet, and then upsetting and expanding such body to bell the opening therethrough.

2. The method of making a bell guide, which consists in cutting away parts of a seamless tube to leave a cylindrical body with integral feet, upsetting and expanding said body in a manner to bell both ends of the opening therethrough, and bending the feet to lie in a plane spaced from the tubular body.

3. The method of making a bell guide, which consists in cutting away parts of a seamless tube, to leave a cylindrical body, with beveled ends and integral tapered feet, and then upsetting and expanding said body in a manner to symmetrically bell both ends of the opening therethrough, substantially as described.

4. The method of making bell guides, which consists in drawing a seamless tube, cutting away parts of said tube to leave a plurality of tubular bodies, connected by an integral web, shearing said web, to separate said tubular bodies from one another, swaging and trimming said web, to form feet, integral with each tubular body, upsetting and expanding each of said tubular bodies, to bell both ends of the opening therethrough, and then bending said feet to lie against the side of a fishing pole, with said tubular bodies spaced therefrom, to hold the guide line out of contact with the windings by which said feet are lashed to the pole.

5. The method of making bell guides, which consists in drawing a seamless tube, cutting away parts of said tube, to leave a plurality of tubular bodies connected by an integral web and having beveled ends, shearing said web to separate said tubular bodies from one another, swaging and trimming said web to form feet integral with each tubular body, and tapered in width, bending these feet toward each other, upsetting and expanding each of said tubular bodies to symmetrically bell both ends of the opening therethrough, and then bending said feet to lie against the side of a fishing pole with said tubular bodies spaced therefrom, to hold the guided line out of contact with the windings, by which said feet are lashed to the pole.

6. The method of making bell guides, which consists in drawing a seamless tube, milling away parts of said tube to leave a plurality of tubular bodies, connected by an integral web and each having beveled ends, shearing said web diagonally to separate said tubular bodies from one another, swaging and trimming said web to form feet integral with each tubular body and tapered in width, bending these feet toward each other, and upsetting and expanding each of said tubular bodies to symmetrically bell both ends of the opening therethrough, and then bending said feet to lie against the side of a fishing pole, with said tubular body spaced therefrom to hold the guided line out of contact with the windings by which said feet are lashed to the pole.

7. The method of making bell guides, which consists in drawing a seamless tube, milling away parts of said tube to leave a plurality of tubular bodies connected by an integral web, and each having beveled ends, trimming the blank so formed, shearing said web diagonally to separate said tubular bodies from one another, swaging and trimming said web to form feet integral with each tubular body and tapered in width and in thickness, bending these feet toward each other, repeatedly upsetting and expanding each of said tubular bodies to symmetrically bell both ends of the opening therethrough, and then bending said feet to lie flat against the side of a fishing pole, with said tubular body spaced therefrom, to hold the guided line out of contact with the windings by which said feet are lashed to the pole, substantially as described.

In testimony whereof I affix my signature.

ELWOOD R. DAVIS.